US009484847B2

(12) United States Patent
Maloum

(10) Patent No.: US 9,484,847 B2
(45) Date of Patent: Nov. 1, 2016

(54) METHOD OF CONTROLLING A PERMANENT MAGNET MOTOR AND CORRESPONDING SYSTEM

(71) Applicant: RENAULT s.a.s., Boulogne-Billancourt (FR)

(72) Inventor: Abdelmalek Maloum, Chevilly Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/425,997

(22) PCT Filed: Jul. 9, 2013

(86) PCT No.: PCT/FR2013/051635
§ 371 (c)(1),
(2) Date: Mar. 4, 2015

(87) PCT Pub. No.: WO2014/037635
PCT Pub. Date: Mar. 13, 2014

(65) Prior Publication Data
US 2015/0214866 A1  Jul. 30, 2015

(30) Foreign Application Priority Data
Sep. 4, 2012  (FR) ..................... 12 58211

(51) Int. Cl.
*H02P 21/00* (2016.01)
*H02P 6/00* (2016.01)
*H02P 21/12* (2016.01)

(52) U.S. Cl.
CPC ............... *H02P 6/002* (2013.01); *H02P 6/28* (2016.02); *H02P 21/12* (2013.01); *H02P 21/22* (2016.02)

(58) Field of Classification Search
CPC . H02P 21/0035; H02P 21/06; H02P 2207/05
USPC ................ 318/400.02, 400.03, 727
See application file for complete search history.

(56) References Cited

U.S. PATENT DOCUMENTS 4,245,181 A * 1/1981 Plunkett ............... G01R 31/343
318/798
4,388,577 A * 6/1983 Blaschke ............ H02P 21/141
318/717

(Continued)

FOREIGN PATENT DOCUMENTS

FR  2 960 358 A1  11/2011
JP  2004-072856 A  3/2004
JP  2012-120297 A  6/2012

OTHER PUBLICATIONS

International Search Report issued May 9, 2014 in PCT/FR2013/051635 filed Jul. 9, 2013.

(Continued)

*Primary Examiner* — Rina Duda
(74) *Attorney, Agent, or Firm* — Oblon, McClelland, Maier & Neustadt, L.L.P.

(57) ABSTRACT

A method for controlling a motor propulsion unit including a motor including a permanent magnet rotor and a stator, the method including regulating currents of the stator so that they attain their setpoints by virtue of control signals, the currents to be regulated and the control signals being expressed in a rotating reference frame including a plurality of axes. The regulating includes for each of the axes of the plurality of axes applying, to the current to be regulated on the respective axis, a linear operator differing as a function of a value of the current to be regulated with respect to its setpoint, the result of the application of the linear operator being a control signal on the respective axis.

7 Claims, 3 Drawing Sheets

(56) References Cited

U.S. PATENT DOCUMENTS

| | | | |
|---|---|---|---|
| 4,677,360 A * | 6/1987 | Garces | H02P 21/085 318/803 |
| 4,814,677 A * | 3/1989 | Plunkett | H02P 6/08 318/400.02 |
| 6,605,912 B1 * | 8/2003 | Bharadwaj | H02P 6/142 318/400.02 |
| 7,960,940 B2 * | 6/2011 | Kariatsumari | H02P 21/0035 318/400.01 |
| 2011/0169436 A1 * | 7/2011 | Takahashi | H02P 21/0035 318/400.3 |
| 2013/0106325 A1 * | 5/2013 | Savio | H02P 6/16 318/400.04 |

OTHER PUBLICATIONS

French Preliminary Search Report issued Jun. 10, 2013 in Patent Application No. FR 12 58211 filed Sep. 4, 2012 (with English translation of categories of cited documents).

* cited by examiner

METHOD OF CONTROLLING A PERMANENT MAGNET MOTOR AND CORRESPONDING SYSTEM

BACKGROUND

The present invention relates generally to the technical field of control of electric motors, and in particular to the control of synchronous permanent magnet electric motors.

A synchronous permanent magnet motor comprises a rotor having one or more permanent magnets and also a stator comprising windings in which currents phase-shifted in relation to one another circulate so as to create a rotary magnetic field in the motor, driving the rotor in rotation. Because the frequency of rotation of the rotor is equal to the frequency of the currents circulating in the stator, the motor or electric machine is said to be "synchronous".

In order to control the torque of such a motor a control system regulates the amplitude of the currents circulating in the stator by applying a suitable sinusoidal voltage to each of the phases of the stator. In order to simplify the control algorithm of the torque in the system, the Park transformation is generally used in order to project the currents and the stator voltages in a rotating reference frame associated with the rotor. Thus, in the Park reference frame the stator voltages to be applied to the stator are determined in order that the corresponding stator currents produce the desired torque. These stator voltages in the Park reference frame are referred to as control signals. By performing the Park inverse transformation the control system then determines the sinusoidal voltages to be applied to the different phases of the stator in order to obtain the desired torque, referred to as the setpoint torque.

The use of such motors, for example as traction motors in an electric or hybrid vehicle, requires a reliable control of the torque that responds quickly depending on the torque needs of the driver and restricts the torque in a value range compatible with the voltage of the traction battery of such a vehicle. When the torque of the motor leaves this value range, the control system of the motor generally becomes unstable, which is to be avoided.

Correctors referred to as integral proportional correctors (IP correctors) are usually used to regulate the currents of the stator of such a motor. Nevertheless, these correctors present problems of instability, in particular when a fast system is desired. In order to overcome this, the parameters of these correctors are calculated in order to ensure the stability margins noted in the specifications to be observed by the motor. In addition, because the intrinsic parameters of permanent magnet motors, such as the internal resistance thereof or inductance thereof, vary from one motor to another, it is known to further increase these stability margins and therefore to further reduce the performance of the corrector so as to be able to use an identical corrector across all motors within the same series of vehicles.

Another example of a corrector not using the integral proportional corrector is disclosed in document EP0702451, which proposes a solution for controlling the speed of a synchronous permanent magnet machine in response to variations in the load of the motor. Such a solution generally requires a calibration of the gain of the corrector as a function of the speed of the machine, or a compensation of static coupling terms, which must be able to be measured perfectly.

BRIEF SUMMARY

One of the objects of the invention is to overcome at least some of the disadvantages of the prior art by providing a method of controlling and a system of controlling a motor propulsion unit that ensure stable and robust control of the torque of a permanent magnet motor independently of the speed thereof and that use identical constant gains for mass-produced motors within the same series.

To this end, the invention proposes a method for controlling a motor propulsion unit comprising an electric motor equipped with a permanent magnet rotor and a stator, said method comprising a step of regulating the currents of the stator so that they attain setpoint current values by virtue of control signals of the electric motor, said currents to be regulated and said control signals being expressed in a rotating reference frame comprising a plurality of axes, said method being characterized in that said regulation step comprises for each of the axes of said plurality of axes a step of applying, to the current to be regulated on said axis, a linear operator that differs as a function of the value of said current to be regulated with respect to the setpoint value thereof, said step of application of said linear operator providing a control signal value on said axis.

Thanks to the invention, linear operators are used to obtain the control signals of the motor, thus making it possible to follow the given current setpoints without adding an integral component, which often generates instability, as soon as a responsive control method is desired. The control method according to the invention thus makes it possible to control the torque of the motor even at variable speed.

In accordance with an advantageous feature of the control method according to the invention, said linear operator comprises:

a first term minimizing or maximizing, as a function of the value of said current to be regulated with respect to the setpoint value thereof, a zero-order component of a control signal estimated on said axis as a function of said currents to be regulated, of the speed of said rotor, and of limit values of value ranges estimating features of said motor propulsion unit, and a second term proportional to said current to be regulated on said axis using a convergence factor.

Thus, the known variation ranges of features of the motor propulsion unit are used, ensuring the robustness of the control method according to the invention. The use of these known variation ranges as well as the formulation in two parts of the linear operator make it possible to quickly converge the currents to be regulated toward the setpoint values thereof.

In accordance with a further advantageous feature, said value ranges comprise at least two estimations selected from the group comprising:

an estimation of the equivalent resistance of the stator, an estimation of an inductance of the motor propulsion unit on one of said axes, an estimation of a flux generated by the permanent magnets of the rotor.

The use of these estimations makes it possible to eradicate the need to measure for each motor propulsion unit using the method according to the invention the intrinsic features of said motor propulsion unit, that is to say the internal resistance thereof, the inductance thereof or the flux generated by the permanent magnets of the rotor. Thus, the invention can be applied without modification to an entire series of mass-produced motor propulsion units.

The motor propulsion unit for example is a motor propulsion unit of an electric or hybrid vehicle having an invariance of the intrinsic features thereof through rotation of a quarter turn.

In accordance with a further advantageous feature, the method according to the invention comprises a step of smoothing of the control signal on one of said axes as soon as the difference in absolute value between the current to be regulated on said axis and the setpoint value thereof is below a predetermined threshold.

This smoothing step permits a facilitated implementation of the method according to the invention by standard actuators.

The invention also relates to a system for controlling a motor propulsion unit comprising an electric motor equipped with a permanent magnet rotor and a stator, said system comprising means for regulating the currents of the stator such that they attain setpoint current values by virtue of control signals of the electric motor, said currents to be regulated and said control signals being expressed in a rotating reference frame comprising a plurality of axes, the system according to the invention being characterized in that said regulation means comprise for each of the axes of said plurality of axes means for applying, to the current to be regulated on said axis, a linear operator that differs as a function of the value of said current to be regulated with respect to the setpoint value thereof, said means for applying said linear operator providing a control signal value on said axis.

In accordance with an advantageous feature of the system according to the invention said linear operator comprises:
 a first term minimizing or maximizing, as a function of the value of said current to be regulated with respect to the setpoint value thereof, a zero-order component of a control signal estimated on said axis as a function of said currents to be regulated, of the speed of said rotor, and of limit values of value ranges estimating features of said motor propulsion unit,
 and a second term proportional to the current to be regulated on said axis using a convergence factor.

In accordance with a further advantageous feature of the system according to the invention, said value ranges comprise at least two estimations selected from the group comprising:
 an estimation of the equivalent resistance of the stator,
 an estimation of an inductance of the motor propulsion unit on one of said axes,
 an estimation of a flux generated by the permanent magnets of the rotor.

In accordance with a further advantageous feature of the system according to the invention, said system also comprises means for smoothing the control signal on one of said axes as soon as the difference in absolute value between the current to be regulated on said axis and the setpoint value thereof is below a predetermined threshold.

The invention also relates to a computer program comprising instructions for implementing the control method according to the invention when said program is run on one or more processors.

The control system according to the invention as well as the computer program according to the invention have advantages similar to those of the control method according to the invention.

BRIEF DESCRIPTION OF THE DRAWINGS

Further advantages and features of the invention will become clearer upon reading a preferred embodiment described with reference to the figures, in which.

DETAILED DESCRIPTION

Figure 1:
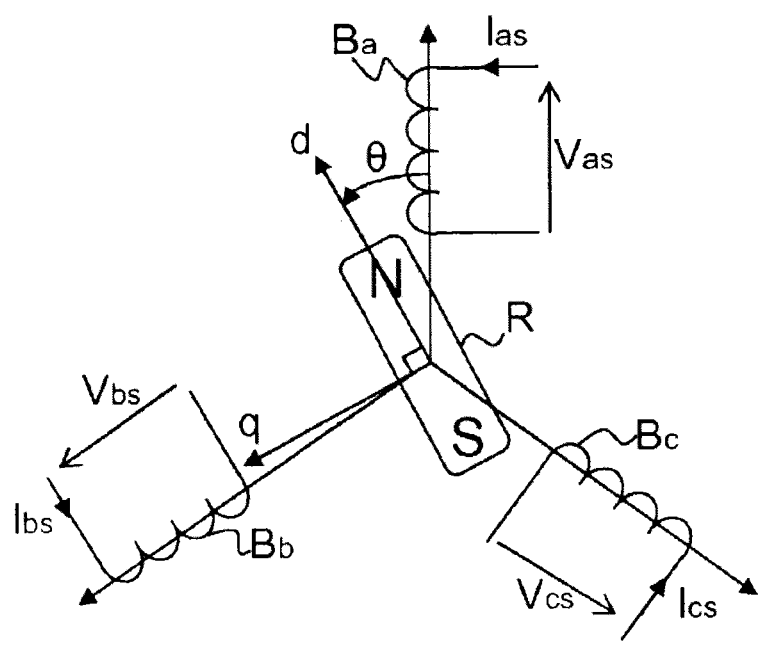
FIG. 1 shows a permanent magnet motor.

In accordance with a preferred embodiment of the invention, the control method according to the invention is used to control the torque of a permanent magnet motor of a motor propulsion unit of an electric vehicle. Such a motor is shown schematically in FIG. 1, with just one pair of poles for simplification. In reality, the motor could comprise a number of pairs of poles, for example five pairs of poles.

The motor comprises a stator wound over three coils Ba, Bb and Bc surrounding a rotor R, these three coils being energized respectively by stator currents Ias, Ibs and Ics, these currents being sinusoidal and phase-shifted in relation to one another by $2\pi/3$ radian. The corresponding sinusoidal stator voltages applied across each coil in order to obtain these currents are Vas, Vbs and Vcs respectively.

In order to simplify the control of this motor, these stator currents and voltages are expressed in a rotating reference frame with the rotor, polar axis d and quadrature axis q. The polar axis d is aligned in the direction from the south pole S to the north pole N of the magnet forming the stator and has an angle of rotation $\theta$ with the coil Ba. The derivative of the angle $\theta$ divided by the number of pairs of poles of the rotor R gives the speed of rotation $\omega_r$ of the magnetic field of the permanent magnet motor in rad/s.

Figure 2:
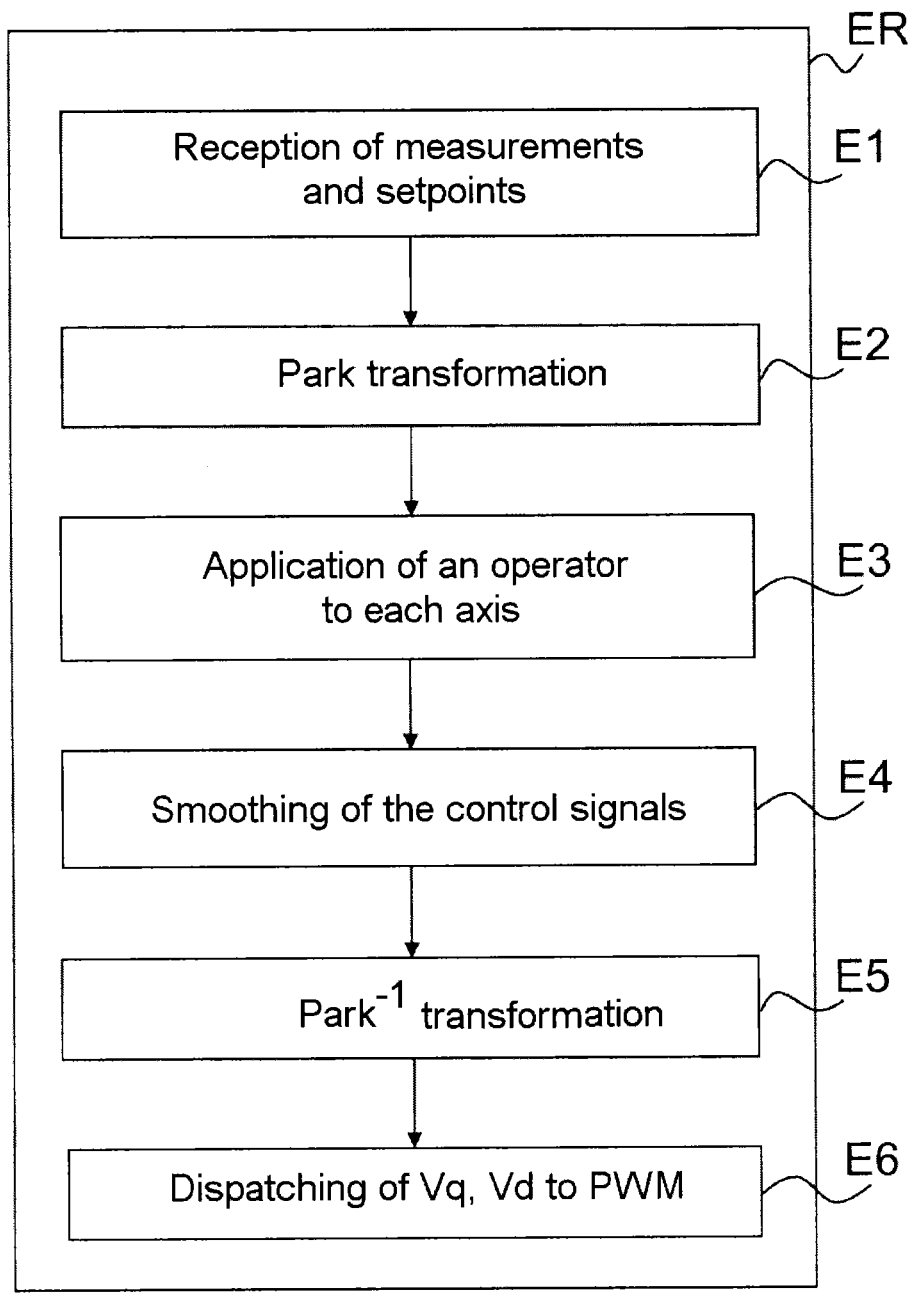
FIG. 2 shows steps of the method for controlling a motor propulsion unit according to the invention in this embodiment of the invention.

With reference to FIG. 2, the control method according to the invention is shown in the form of an algorithm comprising steps E1 to E6 of a superordinate step ER of regulation of the stator currents in order to observe a setpoint torque that must be provided by the permanent magnet motor.

The method is implemented in one or more processors of a motor propulsion unit.

Figure 3:
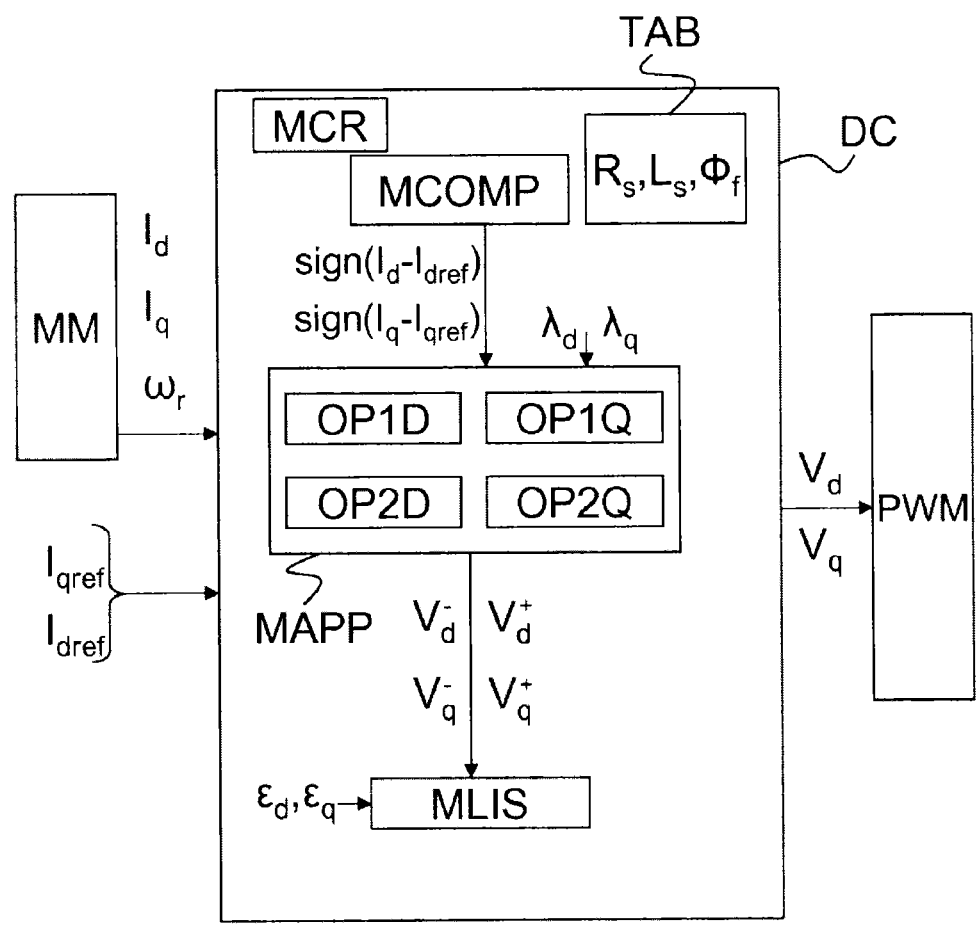
FIG. 3 shows a system for controlling a motor propulsion unit according to the invention in this embodiment of the invention.

The step E1 is the reception by a control device DC, shown in FIG. 3 showing a control system according to the invention, of measurements of stator currents of the motor and of the speed of rotation $\omega_r$ of the magnetic field of the motor, provided by measurement means MM. The step E1 also comprises the reception by the control device DC of setpoint stator currents provided by tables and corresponding to the setpoint torque.

The following step E2 is the Park transformation of the stator currents measured and of the setpoint stator currents received in step E1, performed by the reference frame change means MCR. In a variant, transformations other than the Park-Concordia transformation (often referred to as the Park transformation) can be used, for example the Park-Clarke transformation.

The reference frame change means MCR provide the control device DC with the following values:
 Id corresponding to the value of the stator current measured on the axis d of the Park reference frame in amps,
 Iq corresponding to the value of the stator current measured on the axis q of the Park reference frame in amps,
 Idref corresponding to the stator current setpoint on the axis d of the Park reference frame in amps,
 and Iqref corresponding to the value of the stator current on the axis q of the Park reference frame in amps.

It should be noted that, to simplify FIG. 3, the control device DC therein receives directly the values of currents expressed in the Park reference frame.

The following step E3 is the application, to the stator currents Id and Iq measured and that are to be regulated, of a linear operator on each of the axes of the Park reference frame, said linear operator differing as a function of the value of the value of the current to be regulated on this axis with respect to the setpoint value thereof. This step E3 is based on the theory presented hereinafter.

The control signals of the motor are expressed in the form:

$$V_d = R_s I_d + L_d \dot{i}_d - \omega_r p L_q I_q$$

$$V_q = R_s I_q + L_q \dot{i}_q + \omega_r p(L_d I_d + \Phi_f) \quad \text{(Eq. 1)}$$

Where
- $V_d$ and $V_q$ are the stator voltages on the axes d and q respectively of the Park reference frame, in volts,
- $R_s$ represents the equivalent resistance of the stator of the motor, in ohms,
- $L_d$ and $L_q$ are the inductances on each axis d and q of the Park reference frame, in Henry,
- $\Phi_f$ represents the flux generated by the magnets of the rotor, in Wb,
- and the operator $\dot{x}$ is the operator derived from the variable x.

The objective is to attain the setpoint torque in spite of the presence of the coupling between the axis d and the axis q (at zero speed, no coupling, see Eq. 1) and in spite of the lack of knowledge of the exact values of the flux $\Phi_f$, of the inductances $L_d$ and $L_q$, and of the resistance $R_s$. The torque provided by the motor is expressed as follows:

$$C_{em} = \frac{3}{2} p (\Phi_d I_q - \Phi_q I_d) \quad \text{(Eq. 2)}$$

Where
- $C_{em}$ is the electromagnetic torque generated by the motor,
- p is the number of pairs of poles of the rotor,
- and $\Phi_d$ and $\Phi_q$ represent the flux generated on the axes d and q of the Park reference frame. More precisely:

$$\Phi_d = L_d I_d + \Phi_f \text{ and } \Phi_q = L_q I_q \quad \text{(Eq. 3)}$$

In general, the permanent magnet motors have perfect symmetry between the axes d and q, which means that the following can be written:

$$L_d = L_q = L_s \quad \text{(Eq. 4)}$$

and therefore by combining (2) and (3), the torque provided by the motor is written:

$$C_{em} = \frac{3}{2} p \Phi_f I_q \quad \text{(Eq. 5)}$$

Thus, in order to control the torque by limiting the losses to the greatest possible extent, it is necessary to form an arrangement resulting in a stator current $I_d$ on the axis d as close to zero as possible. In order to provide the setpoint torque, a stator current $I_q$ is then provided on the axis q, and a stator current $I_d$ of zero is provided on the axis d in order to obtain the lowest amplitude of the currents for this torque and therefore minimal iron losses.

In addition, in the control device DC, a table TAB comprising possible variation ranges or value ranges for each parameter $R_s$, $\Phi_f$ and $L_s$ is provided:

$$R_s \in [R_{s\ min}; R_{s\ max}], L_s \in [L_{s\ min}; L_{s\ max}] \text{ and } \Phi_f \in [\Phi_{f\ min}; \Phi_{f\ max}],$$

each of the minimum or maximum values in these intervals taking into consideration variations of the currents and possible dispersions due to the mass production of the permanent magnet motor controlled in accordance with the invention. In a variant the table TAB comprises only one or two value ranges corresponding to one or two parameters selected from $R_s$, $\Phi_f$ and $L_s$, as well as an estimated value, for example a mean value, for each parameter not having a value range.

We will now return to the description of step E3. In this step E3, comparison means MCOMP of the control device DC first compare the stator currents measured Id and Iq with respect to the setpoint values thereof Idref and Iqref. Depending on the sign of the difference between each of these currents to be regulated and the setpoint value thereof, provided by the comparison means MCOMP, an applications means MAPP applies, to each of these currents, a linear operator thus providing two possible stator voltage values on each of the axes d and q as a function of this sign. Thus:

If Id≥Idref, the linear operator OP1D is applied to the current Id and a stator voltage is obtained as follows:

$$V_d^+ = \min(R_s I_d - \omega_r p L_s I_q) - \lambda_d L_{s\ max}(I_d - I_{dref})$$

Where min (x) is the minimum operator of the variable x and $\lambda_d$ is a positive coefficient that serves as a convergence factor. In fact, the lower this coefficient, the more slowly the current Id will converge toward the setpoint value thereof Idref.

The term min $(R_s I_s - \omega_r p L_s I_q)$ minimizes a zero-order component of the control signal Vd by taking, for the resistance $R_s$, the minimal value $R_{s\ min}$ of the value range thereof if the current Id is positive, or the maximum value thereof $R_{s\ max}$ if the current Id is negative, and for the inductance $L_s$, the maximum value $L_{s\ max}$ of the value range thereof if the current Iq is positive, or the minimum value thereof $L_{s\ min}$ if the current Iq is negative.

If Id<Idref, the linear operator OP2D is applied to the current Id and a stator voltage is obtained as follows:

$$V_d^- = \max(R_s I_d - \omega_r p L_s I_q) - \lambda_d L_{s\ max}(I_d - I_{dref})$$

Where max (x) is the maximum operator of the variable x and the term max $(R_s I_d - \omega_r p L_s I_q)$ maximizes a zero-order component of the control signal Vd by selecting, for $R_s$ and $L_s$, the suitable limits of the corresponding value ranges, similarly to the case in which Id≥Idref.

Similarly, if Iq≥Iqref, the linear operator OP1Q is applied to the current Iq and a stator voltage is obtained as follows:

$$V_q^+ = \min(R_s I_q + \omega_r p L_s I_d + \omega_r p \Phi_f) - \lambda_q L_{s\ max}(I_q - I_{qref})$$

Where $\lambda_q$ is a positive coefficient that serves as a convergence factor. In fact, the lower this coefficient, the more slowly the current Iq will converge toward the setpoint value thereof Iqref.

The term $\min(R_s I_q + \omega_r p L_s I_d + \omega_r p \Phi_f)$ minimizes a zero-order component of the control signal Vq by selecting, for $R_s$, $L_s$ and $\Phi_f$, the suitable limits of the corresponding value ranges, as for the previous operators.

Lastly, if Iq<Iqref, the linear operator OP2Q is applied to the current Iq and a stator voltage is obtained as follows:

$$V_q^- = \max(R_s I_q + \omega_r p L_s I_d + \omega_r p \Phi_f) - \lambda_q L_{s\ max}(I_q - I_{qref})$$

The term max $(R_s I_q + \omega_r p L_s I_d + \omega_r p \Phi_f)$ maximizes a zero-order component of the control signal Vq by selecting, for $R_s$, $L_s$ and $\Phi_f$, the suitable limits of the corresponding value ranges, as for the previous operators.

The application of these linear operators to the stator currents Id and Iq measured, in this step E3, makes it possible to converge these currents toward the respective setpoints thereof. In fact, the equation (Eq. 1) combined with the equations defining the stator voltages $V_d^+$, $V_d^-$, $V_q^+$ and $V_q^-$ makes it possible to obtain a positive sign of the derivative of the current Id if Id<Idref and negative if Id≥Idref, and also to have a positive sign of the derivative of the current Iq if Iq<Iqref and negative if Iq≥Iqref.

The following step E4 is a step of smoothing of the stator voltage $V_d$, which switches between $V_d^+$ and $V_d^-$, obtained in step E3, this taking place as soon as the difference in absolute value between the current Id and setpoint value thereof Idref is below a predetermined threshold $\varepsilon_d$, and a step of smoothing of the stator voltage $V_q$, which switches between $V_d^+$ and $V_d^-$, obtained in step E3, this taking place as soon as the difference in absolute value between the current Iq and the setpoint value thereof Iqref is below a predetermined threshold $\varepsilon_q$.

Thus, the control signals Vd and Vq at the end of step E4 are as follows:

$$V_d = \begin{cases} V_d^+ & \text{if } I_d - I_{dref} > \varepsilon_d \\ V_d^- & \text{if } I_d - I_{dref} < -\varepsilon_d \\ \dfrac{((I_d - I_{dref} + \varepsilon_d)V_d^+ - (I_d - I_{dref} - \varepsilon_d)V_d^-)}{2*\varepsilon_d} & \text{if } |I_d - I_{dref}| \le \varepsilon_d \end{cases}$$

$$V_q = \begin{cases} V_q^+ & \text{if } I_q - I_{qref} > \varepsilon_q \\ V_q^- & \text{if } I_q - I_{qref} < -\varepsilon_q \\ \dfrac{((I_q - I_{qref} + \varepsilon_q)V_q^+ - (I_q - I_{qref} - \varepsilon_q)V_q^-)}{2*\varepsilon_q} & \text{if } |I_q - I_{qref}| \le \varepsilon_q \end{cases}$$

This step E4 of smoothing by linear interpolation is performed by the smoothing means MLIS. It is necessary when the stator currents are close enough to the respective setpoints thereof for these currents not to oscillate around the setpoints thereof at the frequency of the processor carrying out the control method according to the invention.

The parameters $\lambda_d$, $\lambda_q$, $\varepsilon_d$ and $\varepsilon_q$ are determined after a step of calibration, prior to the use of the control method according to the invention, by taking into consideration the specifications and so as to ensure the robustness of the method according to the invention.

The following step E5 is the determination of the control signals Vd and Vq in a three-phase system by the reference frame change means MCR, which perform the Park inverse transformation on these signals.

Lastly, step E6 is the dispatch, by the control device DC, of the control signals expressed in this three-phase system, to a PWM inverter that handles these signals and sends them to the permanent magnet motor in order to provide the requested torque.

It should be noted that, in order to simplify FIG. 3, the PWM inverter therein receives directly the control signals expressed in the Park reference frame.

The control method according to the invention thus ensures reliable variation of the current without using an integral term, which can differ in the case of a large error over a parameter. It is of course necessary to estimate the range of variation of the parameters in order to ensure the operation of the control.

This regulation strategy offers the advantage of always varying the currents in the direction of the setpoint so that the actual parameters of the motor are in the range selected. A greater stability is thus ensured than with conventional regulators, which do not take into account dispersions of the parameters. In addition, the regulation is quicker because it always takes into account worst cases. It is no longer necessary to estimate the average parameters, but to provide these with limits, which is much more simple.

It should be noted that in this embodiment of the invention the motor has symmetry between the axes d and q that simplifies the expression of the control signals of the machine, however this embodiment can be easily transposed by a person skilled in the art to the case in which the motor is asymmetrical between the axes d and q. Likewise, in a variant of the invention, the permanent magnet motor is of the asynchronous type.

The invention claimed is:

1. A method for controlling a motor propulsion unit including an electric motor including a permanent magnet rotor and a stator, the method comprising:
   regulating currents of the stator so that they attain setpoint current values by virtue of control signals of the electric motor, the currents to be regulated and the control signals being expressed in a rotating reference frame including a plurality of axes,
   wherein the regulating comprises for each of respective axis of the plurality of axes applying, to the current to be regulated on the respective axis, a linear operator that differs as a function of a value of the current to be regulated with respect to the setpoint value thereof, the applying the linear operator providing a control signal value on the respective axis, and
   wherein the linear operator comprises:
      a first term minimizing or maximizing, as a function of the value of the current to be regulated with respect to the setpoint value thereof, a zero-order component of a control signal estimated on the respective axis as a function of the currents to be regulated, of speed of the rotor, and of limit values of value ranges estimating features of the motor propulsion unit, and
      a second term proportional to the current to be regulated on the respective axis using a convergence factor.

2. The control method as claimed in claim 1, wherein the value ranges comprise at least two estimations selected from:
   an estimation of an equivalent resistance of the stator,
   an estimation of an inductance of the motor propulsion unit on one of the axes,
   an estimation of a flux generated by permanent magnets of the rotor.

3. The control method as claimed in claim 1, further comprising smoothing the control signal on one of the respective axes as soon as a difference in absolute value between the current to be regulated on the respective axis and the setpoint value thereof is below a predetermined threshold.

4. The control method as claimed in claim 1, wherein the motor propulsion unit is a motor propulsion unit of an electric or hybrid vehicle having an invariance of intrinsic features thereof through rotation of a quarter turn.

5. A system for controlling a motor propulsion unit including an electric motor including a permanent magnet rotor and a stator, the system comprising:
   means for regulating currents of the stator so that they attain setpoint current values by virtue of control signals of the electric motor, the currents to be regulated and the control signals being expressed in a rotating reference frame comprising a plurality of axes, wherein the regulation means comprises for each respective axis of the plurality of axes means for applying, to the current to be regulated on the respective axis, a linear operator that differs as a function of a value of the current to be regulated with respect to the setpoint value thereof, the means for applying the linear operator providing a control signal value on the respective axis, and wherein the linear operator comprises:

a first term minimizing or maximizing, as a function of the value of the current to be regulated with respect to the setpoint value thereof, a zero-order component of a control signal estimated on the axis as a function of the currents to be regulated, of speed of the rotor, and of limit values of value ranges estimating features of the motor propulsion unit, and a second term proportional to the current to be regulated on the axis using a convergence factor.

6. The system for controlling a motor propulsion unit as claimed in claim 5, wherein the value ranges comprise at least two estimations selected from:

an estimation of an equivalent resistance of the stator, an estimation of an inductance of the motor propulsion unit on one of the axes, and an estimation of a flux generated by permanent magnets of the rotor.

7. The system for controlling a motor propulsion unit as claimed in claim 6, further comprising means for smoothing the control signal on one of the axes as soon as a difference in absolute value between the current to be regulated on the respective axis and the setpoint value thereof is below a predetermined threshold.

* * * * *